United States Patent [19]

Joormann et al.

[11] 4,439,008
[45] Mar. 27, 1984

[54] OPTICAL FIBER OF THE GRADED INDEX TYPE AND METHOD OF PRODUCING SAME

[75] Inventors: Hendrik J. M. Joormann; Gijsbertus A. C. M. Spierings, both of Eindhoven, Netherlands

[73] Assignee: U.S. Philips Corporation, New York, N.Y.

[21] Appl. No.: 387,993

[22] Filed: Jun. 14, 1982

[30] Foreign Application Priority Data

Jun. 26, 1981 [NL] Netherlands ............... 8103089

[51] Int. Cl.³ .......................... C03C 3/04; C03C 3/10; C03C 13/00; G02B 5/14
[52] U.S. Cl. ...................... 350/96.31; 65/3.13; 350/96.34; 501/37; 501/38; 501/55; 501/64; 501/69; 501/70
[58] Field of Search .................. 350/96.34, 96.31; 65/3.13; 501/37, 38, 55

[56] References Cited

U.S. PATENT DOCUMENTS

| | | | |
|---|---|---|---|
| 3,937,625 | 2/1976 | Stewart | 65/136 |
| 4,264,131 | 4/1981 | Sawamura et al. | 501/37 |
| 4,275,951 | 6/1981 | Beales et al. | 501/37 |
| 4,351,659 | 1/1983 | Beales et al. | 65/3.13 |
| 4,367,012 | 1/1983 | Ikeda et al. | 501/37 |

FOREIGN PATENT DOCUMENTS

| | | | |
|---|---|---|---|
| 80-18109 | 10/1980 | European Pat. Off. | 501/37 |
| 80-18110 | 10/1980 | European Pat. Off. | 501/37 |
| 54-148811 | 11/1979 | Japan | 350/96.34 |
| 2002341 | 2/1979 | United Kingdom | 501/37 |

*Primary Examiner*—Helen M. McCarthy
*Attorney, Agent, or Firm*—Marc D. Schechter

[57] ABSTRACT

An optical fiber of the graded index type consisting of a glass having predominantly the composition 60–70 mole % $SiO_2$, 15–30 mole % alkali metal oxides, and 10 to 15 mole % MgO in combination with at least one oxide selected from the group formed by CaO, SrO, BaO and ZnO. The impurity content of the fiber is less than 0.01 ppm. In the fiber the MgO content increases from the axis of the fiber to the circumference of the fiber. The oxide or the other oxides, having cations which can be exchanged for the magnesium cation, decrease to a corresponding extent in this direction.

7 Claims, 2 Drawing Figures

OPTICAL FIBER OF THE GRADED INDEX TYPE AND METHOD OF PRODUCING SAME

BACKGROUND OF THE INVENTION

The invention relates to optical fibers of the graded index type consisting of a silicate glass containing magnesium oxide together having one or more metal oxides with cations which can be exchanged for the magnesium cation. The refractive index gradient is caused by a decreasing metal oxide concentration and an increasing magnesium oxide concentration from the axis radially outward in the direction of the fiber circumference.

Optical fibers of this type are known from published United Kingdom Patent Application GB No. 2,002,341. The glasses described therein are of the boro-silicate type and contain alkali metal oxides in addition to metal oxides having exchangeable cations, such as alkaline earth oxides. The optical fibers are produced by means of the double crucible technique.

Purer starting materials are becoming available to a greater extent for producing glasses for the manufacture of optical fibers by the double crucible method. As a consequence, the attenuation of the light signal through such a fiber depends to a lesser extent on impurities in the glass originating from the starting materials.

Attenuation of the light signal, however, is also due, in part to so-called intrinsic attenuation, which depends on the properties of the glass constituents per se.

The wavelength range between approximately 1100 and 1500 nm is becoming of increasing interest in optical telecommunications.

It has been found that at wavelengths longer than approximately 1200 nm boron oxide absorbs light in a troublesome manner. Because of this high intrinsic absorption, borosilicate glasses are therefore not suitable for use in this wavelength range if low intrinsic attenuation is desired.

SUMMARY OF THE INVENTION

It is an object of the invention to provide a glass fiber of the type described above, having a small intrinsic attenuation between 1100 and 1500 nm.

According to the invention, this object is accomplished by means of a fiber which consists of a glass having the following composition:
- 60 to 70 mole % silicon dioxide,
- 15 to 30 mole % alkali metal oxides, the quantity of lithium oxide being 0–15 mole %, and
- 10 to 25 mole % magnesium oxide in combination with at least one metal oxide chosen from the group consisting of CaO, SrO, BaO and ZnO, the quantity of calcium oxide being 0–15 mole %, and the content of impurities absorbing radiation in the wavelength range up to 1500 nm being less than 0.01 ppm.

In glasses of this composition up to 5 mole % of the silicon dioxide may be replaced by $Al_2O_3$ and/or $GeO_2$, and up to 2.5 mole % of the silicon dioxide may be replaced by $Y_2O_3$ and/or $ZrO_2$. These substitutions are to be calculated with respect to the total glass composition.

The alkali metal oxide part of the fiber material may consist of two or more oxides of the alkali metals Li, Na and K, with the proviso that if $Li_2O$ is present, it may not be present in a quantity greater than 15 mole %. If there is more than 15 mole % $Li_2O$, there is a risk that during production of the fiber, phase separation may occur, crystalline LiMg-orthosilicate then being formed. If ZnO is present LiZn-orthosilicate may then also be produced.

If the glass contains less than 60 mole % $SiO_2$ then crystallization easily occurs, which causes an increase in scattering of the light signal. If the glass contains more than 70 mole % $SiO_2$ it becomes more difficult to process (higher melting temperature, high fiber-drawing temperature), while the quantity of oxide having exchangeable cations in the glass then becomes too small to obtain a sufficiently larger difference in the index of refraction.

If the glass contains less than 15 mole % of alkali metal oxides, then the tendency to crystallize increases considerably, while the processability of the glass decreases.

If the glass contains more than 30 mole % of alkali metal oxides, then the chemical resistance significantly decreases. Also, the quantity of oxide having exchangeable cations then becomes too small to produce a sufficiently large difference in the refractive index.

The oxides MgO, SrO, BaO and ZnO may be present in the glass in an amount of 10 to 25 mole %. The amount of CaO if present should, however, not be greater than 15 mole %. If CaO is present in greater amounts the glass is apt to crystallize.

It may be necessary, in order to obtain a refractive index difference of 1% between the starting glass in the inner crucible (the core glass) and the starting glass in the outer crucible (the cladding glass), to have in the core glass up to 60% of the 10 to 25 mole % as magnesium oxide. The remaining part of the metal oxide may be chosen from the group of metal oxides consisting of CaO, SrO, BaO and ZnO. The cladding glass usually comprises only magnesium oxide as the metal oxide, in preferred embodiments.

Preferably, a glass composition is used comprising 60–70 mole % silicon dioxide, 15–27.5 mole % of alkali metal oxides, the quantity of lithium oxide being 0–15 mole % and 12.5 mole % of (CaO+MgO). This composition makes it possible to obtain a difference in the index of refraction of 1% while the intrinsic absorption of the glass is particularly low.

The presence of a comparatively small quantity of $GeO_2$ hardly affects the intrinsic absorption in the wavelength range which is of interest, while it produces a marked decrease in the processing temperature of the glasses. The addition of $Al_2O_3$, $Y_2O_3$ and $ZrO_2$ to the glasses improves their chemical resistance. The glasses may further contain small quantities of fluorine, which is added during preparation in the form of LiF.

The glasses are prepared as follows. The starting materials are alkali metal carbonates and/or nitrates, silicon dioxide and other metal carbonates, nitrates and/or oxides (of Mg, Ca, Sr, Ba and/or Zn) of the highest possible purity. This means that the level of impurities absorbing in the relevant wavelength range of 1100 to 1500 nm (such as Cu, Fe, and Cr) is less than 0.01 ppm. Furthermore, refining agents such as $As_2O_3$ and $Sb_2O_3$ may be added in a quantity up to 1 mole %, calculated with respect to the entire glass composition.

Preferably, the glasses are melted by heating by means of a high-frequency electric field in a crucible made of a material having low dielectric losses at the selected frequency. The wall of the crucible is cooled (see, for example, U.S. Pat. No. 3,937,625).

The glass melts are kept for some time (for example 1 to 10 hours) at a temperature of at least 1300° C. Dry gases such as oxygen, carbon monoxide or carbon dioxide, optionally mixed with $D_2O$ may be blown through the melt. Thereafter, rods are drawn from the melt. These rods serve as the starting material for the production of optical fibers. For this purpose they are melted preferably in a double crucible in which at least the core glass is heated by means of a high-frequency electric field in a cooled wall crucible.

This last-mentioned method and such a double crucible are the subject of a co-pending Netherlands Patent Application No. 81 02 878 corresponding to the co-pending U.S. patent application Ser. No. 387,919, filed June 14, 1982. This patent application describes a method of producing an optical fiber by means of a double crucible method. In the method a double crucible is used in which at least the inner crucible has a double-wall construction. In the space enclosed by the double wall, a metal wire coil is accommodated. During manufacture of the optical fiber heat is generated in the core glass by means of a high-frequency electric field, and the crucible wall is cooled with a coolant. A relatively cold layer of the core glass forms on the wall of the inner crucible. This comparatively cold glass layer, which does not contribute to the build-up of the optical fiber prevents impurities from diffusing from the crucible material into the core glass and prevents crucible material from dissolving. Thus, it is possible to draw the optical fibers at higher temperatures than was considered to be practical up to the time of that invention.

By using this method, it becomes possible to keep at least the core glass at a temperature which is sufficiently high to allow drawing of the fiber without the impurities being absorbed from the inner crucible. During drawing of the fiber, the temperature of the glasses in the crucibles is at least 900° C. or higher.

DESCRIPTION OF THE PREFERRED EMBODIMENTS

Figure 1:
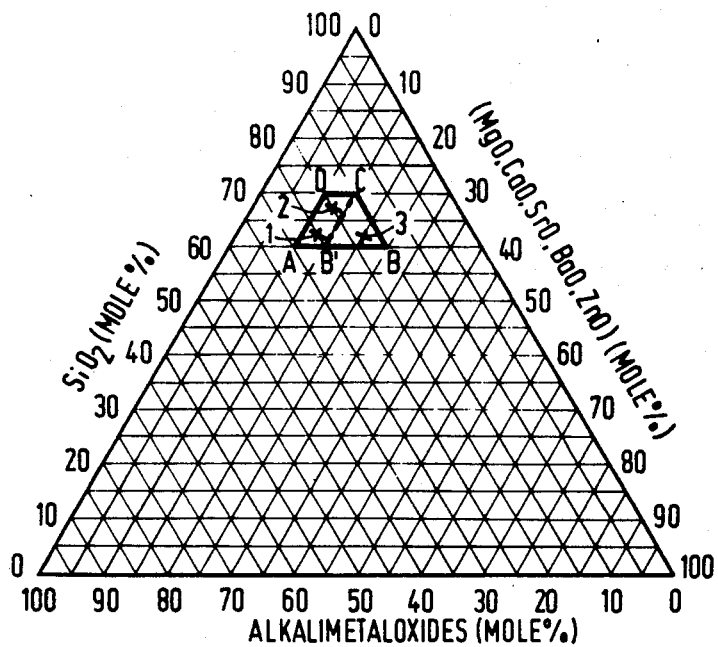
FIG. 1 is a ternary diagram of glass compositions usable in optical fibers according to the invention.

In the triangular diagram of FIG. 1, the region ABCD indicates the region of compositions, in which glasses are found which may be prepared at approximately 1300° C. and higher and which, even after having been kept for 24 hours at 1000° C., have no or only little tendency for phase separation or crystallization, except such glasses which, contain CaO. In the region AB'CD glass compositions are found, however, which do not crystallize under these circumstances if such glasses contain CaO in an amount up to 15 mole %. With these glasses optical fibers can be obtained which have an intrinsic scattering less than 0.45 dB/km at 1100 nm.

Table I shows some examples of glass compositions. In each example the difference between the index of refraction of the core and cladding glass is 1%. In addition to the indicated quantities of oxides with exchangeable cations, the core and cladding glasses always contained 62.5 mole % $SiO_2$ and 25 mole % alkali metal oxides (5 mole % of $Li_2O$, 10 mole % of $Na_2O$ and 10 mole % of $K_2O$).

TABLE I

| cladding glass | core glass |
| --- | --- |
| 12.5 mole % (8.4 weight %) MgO | 12.5 mole % (11.4 weight %) CaO |
| 12.5 mole % (8.4 weight %) MgO | 6.5 mole % (3.9 weight % MgO + 6 mole % (13.8 weight %) BaO |
| 12.5 mole % (8.4 weight %) MgO | 3 mole % (1.8 weight %) MgO + 9.5 mole % (13.8 weight %) SrO |
| 12.5 mole % (8.4 weight %) MgO | 3 mole % (6.9 weight %) BaO + 9.5 mole % (11.5 weight %) ZnO |

In Table II the compositions of some glasses are given together with their intrinsic scattering at 1000 nm and the attenuation at 850 nm in dB. For measuring purposes only, the glasses were drawn into fibers and coated with a silicone resin layer. The numbers in Table II are given in mole %, with the equivalent weight percent in parenthesis.

TABLE II

| | $SiO_2$ | MgO | ZnO | SrO | BaO | $Li_2O$ | $Na_2O$ | $K_2O$ | intrinsic scattering | attenuation |
| --- | --- | --- | --- | --- | --- | --- | --- | --- | --- | --- |
| 1 | 62.5 (57.7) | 4 (2.5) | — | 8.5 (13.5) | — | 5 (2.3) | 10 (9.5) | 10 (14.5) | 1.20 | 6.4 |
| 2 | 62.5 (57.9) | — | 12.5 (15.7) | — | — | 5 (2.3) | 10 (9.6) | 10 (14.5) | 0.93 | 13.5* |
| 3 | 62.5 (56.5) | 6.5 (3.9) | — | — | 6 (13.8) | 5 (2.2) | 10 (9.3) | 10 (14.1) | 1.90 | 7.5 |
| 4 | 62.5 (57.6) | — | 15 (18.7) | — | — | 4.5 (2.1) | 9 (8.6) | 9(13) | 0.99 | 6.5 |
| 5 | 62.5 (59.5) | 6.5 (4.2) | — | — | 6 (14.6) | 4 (1.9) | 8 (7.9) | 8(12 | 1.60 | 6.4 |

In the fibers according to the invention, the cladding glass has the highest chemical resistance and the lowest coefficient of thermal expansion, compared to the core glass, due to the presence of MgO. The low coefficient of thermal expansion results in the outer surface of the optical fiber of the invention being subjected to a compressive stress, which considerably improves the strength of the fiber.

EXAMPLE 1

The following glasses were prepared by melting the relevant metal oxides in the forms of the nitrates and silicon dioxide and by heating them for 1½ hour at 1350° C. with oxygen being bubbled through the melt.

| Core glass: | | Cladding glass: | |
| --- | --- | --- | --- |
| $Li_2O$ | 5 mole % (2.4 weight %) | $Li_2O$ | 5.0 mole % (2.5 weight %) |
| $Na_2O$ | 10 mole % (10 weight %) | $Na_2O$ | 10.0 mole % (10.4 weight %) |
| $K_2O$ | 10 mole % (15.3 weight %) | $K_2O$ | 10.0 mole % (15.8 weight %) |
| CaO | 12.5 mole % (11.4 weight %) | MgO | 12.5 mole % (8.4 weight %) |
| $SiO_2$ | 62.5 mole % (60.9 weight %) | $SiO_2$ | 62.5 mole % (62.9 weight %) |
| n = 1.530 | | n = 1.515 | |

Figure 2:
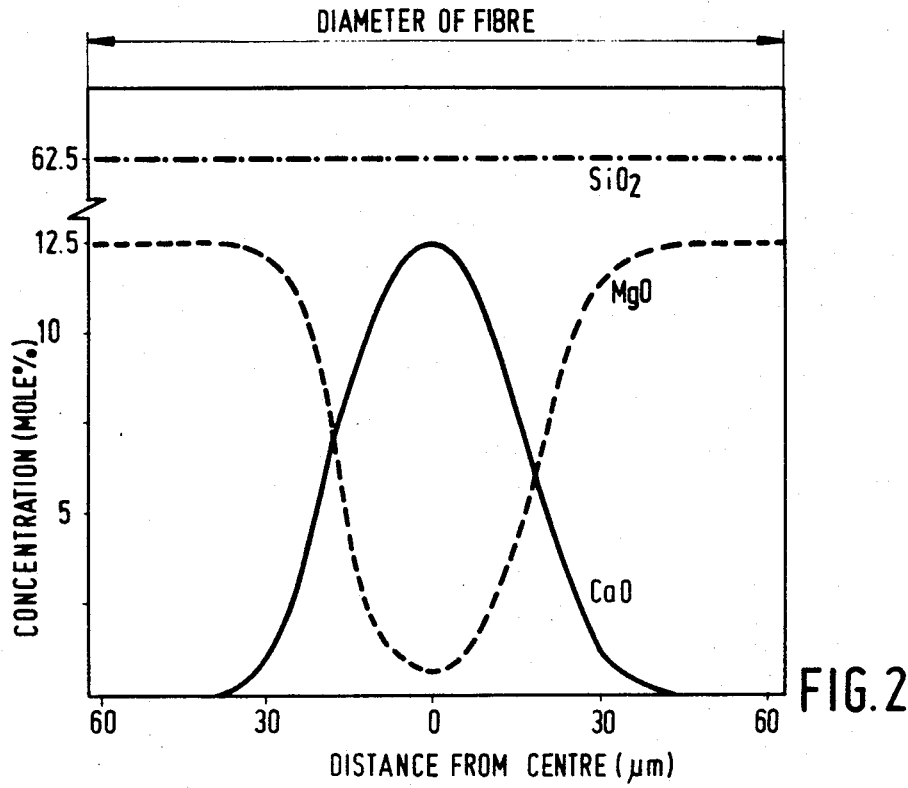
FIG. 2 is a graph of the concentrations of MgO and CaO, respectively, in a graded index fiber according to the invention.

Optical fibers were drawn from the above glasses at a temperature of 1100° C. until an overall diameter of 125 μm was reached. A double crucible with a heated 10 cm long outflow pipe was used. In this manner a graded index fiber was obtained. The numerical aperture was 0.19, the intrinsic scattering 0.45 dB/km at 1100 nm and 0.13 dB/km at 1500 nm, the total attenuation at 850 nm was 5.1 dB/km and the intrinsic scattering 1.3 dB/km. The difference can be explained from the presence of water in the fiber. FIG. 2 shows the concentration gradient of this fiber obtained by using a scanning electron microscope.

EXAMPLE 2

An optical fiber can be obtained in the manner described in Example 1 from glasses having the following compositions.

| Core glass: | | Cladding glass: | |
|---|---|---|---|
| $Li_2O$ | 4 mole % (1.8 weight %) | $Li_2O$ | 4 mole % (2 weight %) |
| $Na_2O$ | 8 mole % (7.5 weight %) | $Na_2O$ | 8 mole % (8.4 weight %) |
| $K_2O$ | 8 mole % (11.4 weight %) | $K_2O$ | 8 mole % (12.7 weight %) |
| MgO | 6.5 mole % (4 weight %) | MgO | 12.5 mole % (8.5 weight %) |
| BaO | 6 mole % (13.9 weight %) | $SiO_2$ | 67.5 mole % (68.4 weight %) |
| $SiO_2$ | 67.5 mole % | n = 1.510 | |
| n = 1.525 | (1.4 weight %) | | |

EXAMPLE 3

An optical fiber can be obtained in the manner described in Example 1 from glasses having the following compositions.

| core glass: | | cladding glass: | |
|---|---|---|---|
| $Li_2O$ | 3.5 mole % (1.6 weight %) | $Li_2O$ | 3.5 mole % (1.8 weight %) |
| $Na_2O$ | 7 mole % (6.8 weight %) | $Na_2O$ | 7 mole % (7.5 weight %) |
| $K_2O$ | 7 mole % (10.3 weight %) | $K_2O$ | 7 mole % (11.4 weight %) |
| MgO | 5 mole % (3.2 weight %) | MgO | 20 mole % (14 weight %) |
| ZnO | 15 mole % (9.1 weight %) | $SiO_2$ | 62.5 mole % (65.2 weight %) |
| $SiO_2$ | 62.5 mole % | n = 1.516 | |
| n = 1.531 | (58.9 weight %) | | |

In the present specification and in the claims below the term core glass means the glass which is present in the inner crucible. The term cladding glass means the glass which is present in the outer crucible of a double crucible arrangement for drawing fibers. After drawing the fibers and the exchange between the exchangeable cations, a graded index fiber is produced having a continuous concentration gradient of the exchangeable cations from the fiber axis to the fiber circumference.

In this specification and in the claims the glass composition given for the optical fiber is the overall composition.

What is claimed is:

1. A graded index glass optical fiber having an axis and a circumference, said fiber consisting essentially of:
   60 to 70 mole % silicon dioxide;
   15 to 30 mole % of two or more alkali metal oxides, the quantity of lithium oxide not exceeding 15 mole %; and
   10 to 25 mole % magnesium oxide in combination with at least one metal oxide having a cation which can be exchanged with the magnesium cation, said metal oxide being selected from the group consisting of CaO, SrO, BaO, and ZnO, the quantity of CaO not exceeding 15 mole %;
   wherein the fiber is substantially free of boron contains less than 0.01 parts per million of impurities which absorb radiation having a wavelength up to 1500 nanometers; and
   wherein the graded refractive index is caused by a decreasing exchangeable cation concentration and an increasing magnesium concentration in the fiber from the fiber axis to the fiber circumference.

2. An optical fiber as claimed in claim 1, characterized in that;
   up to 5 mole % of silicon dioxide is replaced with one or more of germanium oxide and aluminum oxide; and
   up to 2.5 mole % of silicon dioxide is replaced by one or more of yttrium oxide and zirconium dioxide.

3. An optical fiber as claimed in claim 1, characterized in that the optical fiber consists essentially of:
   60 to 70 mole % silicon dioxide;
   15 to 27.5 mole % of two or more alkali metal oxides, the quantity of lithium oxide not exceeding 15 mole %; and
   12.5 mole % magnesium oxide and CaO.

4. A method of producing a graded index glass optical fiber, said method comprising the steps of:
   providing a double crucible having an inner crucible and an outer crucible;
   providing, in the inner crucible, a glass consisting essentially of 60 to 70 mole % silicon dioxide, 15 to 30 mole % of two or more alkali metal oxides, the quantity of lithium oxide not exceeding 15 mole %, and 10 to 25 mole % of at least one metal oxide having a cation which can be exchanged with a magnesium cation, said metal oxide being selected from the group consisting of CaO, SrO, BaO, and ZrO;
   providing, in the outer crucible, a glass consisting essentially of 60 to 70 mole % silicon dioxide, 15 to 30 mole % of two or more alkali metal oxides, the quantity of lithium oxide not exceeding 15 mole %, and 10 to 25 mole % of MgO;
   heating the glasses to a fiber drawing temperature; and
   drawing the glasses out of the crucibles with the glass from the outer crucible surrounding the glass from the inner crucible, to form an optical fiber;
   wherein the fiber is substantially free of boron and contains less than 0.01 parts per million of impurities which absorb radiation having a wavelength up to 1500 nanometers; and
   wherein the graded refractive index is caused by a decreasing exchangeable cation concentration and an increasing magnesium concentration in the fiber from the from axis to the fiber circumference.

5. A method as claimed in claim 4, characterized in that the glass in the inner crucible further comprises MgO, the total quantity of MgO, CaO, SrO, BaO and ZnO being from 10 to 25 mole % of the quantity of glass in the inner crucible, the quantity of MgO being up to 60 mole % of the quantity of CaO, SrO, BaO, and ZnO.

6. A method as claimed in claim 4, characterized in that;
   up to 5 mole % of silicon dioxide is replaced with one or more of germanium oxide and aluminum oxide; and up to 2.5 mole % of silicon dioxide is replaced by one or more of yttrium oxide and zirconium dioxide.

7. A method as claimed in claim 4, characterized in that;

the glass in the inner crucible consists essentially of 60 to 70 mole % silicon dioxide, 15 to 27.5 mole % of two or more alkali metal oxides, the quantity of lithium oxide not exceeding 15 mole %, and 12.5 mole % CaO; and the glass in the outer crucible consists essentially of 60 to 70 mole % silicon dioxide, 15 to 27.5 mole % of two or more alkali metals oxides, the quantity of lithium oxide not exceeding 15 mole %, and 12.5 mole % MgO.

* * * * *

UNITED STATES PATENT AND TRADEMARK OFFICE
CERTIFICATE OF CORRECTION

PATENT NO. : 4,439,008
DATED : March 27, 1984
INVENTOR(S) : HENDRIK J.M. JOORMANN ET AL It is certified that error appears in the above—identified patent and that said Letters Patent is hereby corrected as shown below:

In the claims:

Column 6, Claim 4, Line 31
change "from" (second occurrence)
to --fiber--.

Signed and Sealed this

Seventh Day of May 1985

[SEAL]

Attest:

DONALD J. QUIGG

Attesting Officer     Acting Commissioner of Patents and Trademarks